Patented July 23, 1946

2,404,737

UNITED STATES PATENT OFFICE 2,404,737

SULPHANILYLSULPHANILAMIDE DERIVATIVES

Maurice L. Moore, Detroit, Mich., assignor to Sharp & Dohme, Incorporated, Philadelphia, Pa., a corporation of Maryland No Drawing. Application July 5, 1943, Serial No. 493,578

20 Claims. (Cl. 260—239.6)

This invention relates to $N^4$-carboxyacyl-sulphanilylsulphanilamidothiazoles, in which the carboxyacyl group is the radical remaining when the hydroxyl group is removed from only one of the two or more carboxyl groups of a polycarboxylic acid, and the invention covers such products containing the remaining carboxyl group or groups unaltered as well as with the hydrogen in any of such remaining carboxyl groups replaced by a carboxylate-forming element or radical.

The new products of this invention are in general therapeutically useful in varying degrees and applications, for example, in treating ailments of the intestinal tract.

The products of this invention may be represented by the general formula

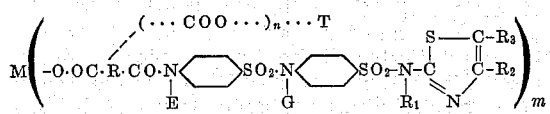

in which M is selected from hydrogen and monovalent and polyvalent radicals capable of combining with a carboxyl radical to form a carboxylate, such as the alkali metals sodium, potassium, lithium and the like, the alkaline earths as calcium, magnesium, barium and the like, antimony, copper, gold, iron, bismuth and manganese and the like, an alkyl radical, a nitrogen base as ammonium and corresponding radicals of alkyl amines and alkanolamines and the like; and R is the residue of a polycarboxylic acid, aliphatic, aromatic, as well as heterocyclic, stripped of its carboxyl groups; and T is selected from hydrogen and the M-monovalent radicals and free valences of the M-polyvalent radicals not satisfied by the single carboxyl group shown directly linked to M; and $n$ is selected from zero and any whole number up to four, whereby the grouping $(\cdots COO \cdots)_n \cdots T$ represents the carboxyl and the carboxylate groups over two from any polycarboxylic acid having more than two carboxyl groups, and $m$ is a small number selected from the class consisting of (A) one, in those compounds embraced herein in which all of the carboxyl groups in the carboxyacyl radical satisfy all of the valences of any polyvalent radicals represented by M and T, and (B) a small number equal to the valences of M, in those compounds embraced herein and selected from those (a) in which $n$ is zero, (b) in which each occurrence of the radical T is selected from hydrogen and any of the monovalent radicals represented by T, and (c) in which each occurrence of the radical T is different from the radical M; and E, G, and $R_1$ are each separately selected from hydrogen and alkyl, aralkyl and aryl radicals; and $R_2$ and $R_3$ may be separately hydrogen as well as an alkyl radical, saturated or unsaturated, for example, methyl, ethyl, propyl, butyl, amyl, allyl, hexyl, heptyl, octyl and the like, or decyl, dodecyl, hexadecyl and the like, as well as an aralkyl radical as benzyl and the like, as well as an aryl radical as phenyl (unsubstituted as well as substituted, for example, having nitro, amino, alkyl, carboxyl, sulphonic acid, hydroxy, alkoxy with the alkyl saturated or unsaturated and straight or branched chain, phenyl, halogen such as chlorine, and the like substituents, as well as the naphthyl and diphenyl radicals, each similarly unsubstituted as well as substituted, and a nitrogen-containing radical as nitro and amino (unsubstituted and substituted as acyl- and alkyl-), and an oxygenated radical, for example, hydroxy, alkoxy such as methoxy, ethoxy, propoxy, and carbalkoxy such as carbmethoxy, carboxyl, and halo-alkyl as chlorethyl and the like, and halogen, for example, chlorine and bromine.

In this specification and its appending claims, the term "carboxylates" relates to the products resulting when the acid form of the products of the invention (that is, the form in which the carboxyl groups of the compounds have not been neutralized) is converted to the carboxylate form by replacement of the hydrogen of the free carboxyl group or groups thereof by a mono-valent metal or group, or by one of the valences of a poly-valent metal as illustrated at column 1, lines 23-32 above.

The carboxyacyl group (remaining group when the hydroxy group is removed from only one of the at least two carboxyl groups of a polycarboxylic acid) may be derived from any desirable polycarboxylic acid, for example, aliphatic, aromatic, and heterocyclic, such as the aliphatic polycarboxylic acids as the saturated aliphatic polycarboxylic acids such as the dicarboxylic acids, oxalic and malonic acids and their methylene-non-substituted homologues, succinic, glutaric, adipic, pimelic, suberic, azelaic and sebacic acids and the like, and derivatives thereof exemplified by malonic acid and its homologues, in any of which at least one of the hydrogens of at least one of the available chain methylene groups is replaced by any desirable substituent, for example, alkyl (saturated as well as unsaturated), hydroxy, amino, carboxyl, and the like. Of such derivatives, the saturated-alkyl-substituted-methylene type is shown by the monoalkyl examples as methyl-malonic, ethyl-malonic, butyl-malonic, pyrotartaric (methyl-succinic) and ethyl-succinic acids, and the saturated-dialkyls by dimethyl-malonic and diethyl-malonic acids, and the unsaturated-alkyl by allyl-malonic acid. The hydroxy-substituted-methylene type is exemplified by tartronic (hydroxy-malonic) and malic (hydroxy-succinic, in the three isomeric forms) acids and the polyhydroxy-substituted by the dihydroxy type shown by tartaric (dihydroxy-succinic) acid and the tetrahydroxy example in talomucic acid. The amino-substituted-methylene type is demonstrated by aspartic (aminosuccinic) and glutamic acids. The mixed-substituted-methylene type is shown by citramalic (2-hydroxy-2-methyl-butanedioic) and citric acids, the latter serving also to point out the carboxylic-substituted-methylene type.

Unsaturated aliphatic dicarboxylic acids from which the carboxyacyl radical is derived correspond to any of the above mentioned saturated examples having at least four carbon atoms and further particularized by maleic and citraconic (methylmaleic) acids and their respective isomers, fumaric and mesaconic (methyl-fumaric) acids.

Other aliphatic polycarboxylic acids from which the carboxyacyl radical may be derived are the tribasic, saturated as well as unsaturated, acids exemplified respectively by tricarballylic and aconitic acids and derivatives thereof as those in which any of the methylene or chain hydrogens is replaced by any desirable substituent (as pointed out in relation to the dicarboxylic acids) illustrated by citric acid.

The aromatic (aryl) polycarboxylic acids from which the carboxyacyl radical may be derived may be an aryl dicarboxylic acid or aryl tricarboxylic acid as trimellitic acid as well as one containing up to six carboxyl groups, as mellitic acid, and those having replaceable hydrogen atoms may or may not have other substituents on the aromatic nucleus. Those having no substituents on the aromatic nucleus are illustrated by the aryl dicarboxylic acids, such as the isomeric phthalic acids, phthalic (ortho), isophthalic (meta) and terephthalic (para). In those having other substituents on the nucleus, such substituents may be illustrated by alkyl (mono- and di-), alkoxy, hydroxy, halo, nitro and other common groups, for example, xylidic (or uvitic, 5-methyl-1,3-dicarboxylicbenzene), cumidic (dimethyl-phthalic), hemipic (dimethoxy-phthalic), and coccinic (hydroxy-methyl-phthalic) acids. While the above specifically named aromatic acids illustrate the mononuclear or phenyl-polycarboxylic acid type, these aromatic polycarboxylic acids include also those of the polynuclear type such as the naphthyl polycarboxylic acids as naphthalic (naphthalene-1,8-dicarboxylic acid), naphthalene-1,2-dicarboxylic acid, naphthalene-2,3-dicarboxylic acid, naphthalene-1,4-dicarboxylic acid and naphthalene-1,5-dicarboxylic acid.

The heterocyclic polycarboxylic acids from which the carboxyacyl radical may be derived may be any desirable heterocyclic polycarboxylic acid, for example, the pyridine polycarboxylic acids as the dicarboxypyridines such as quinolinic acid (2,3-dicarboxypyridine), lutidinic acid (2,4-dicarboxypyridine), 2,5-dicarboxypyridine, cinchomeronic acid (3,4-dicarboxypyridine), dipicolinic acid (2,6-dicarboxypyridine), and dinicotinic acid (3,5-dicarboxypyridine), also the diazine polycarboxylic acids as the dicarboxydiazines, for example, the dicarboxypyrazines, such as antipellagric acid (2,3-dicarboxypyrazine), 2,5-dicarboxypyrazine and 2,6-dicarboxypyrazine, as well as the derivatives thereof substituted on the nucleus, for example, those alkyl-substituted on the nucleus, as the homologs of antipellagric acid such as the nuclear-monoalkyl derivatives, as 2,3-dicarboxy-5-methyl-pyrazine, and the nuclear-dialkyl derivatives as 2,3-dicarboxy-5,6-dimethyl-pyrazine, as well as 2-carboxy-3-methyl-5-carboxy-6-methyl pyrazine, and also dicarboxypyridazines such as 4,5-dicarboxypyridazine as well as the derivatives thereof substituted on the nucleus, such as those alkyl substituted on the nucleus as 4,5-dicarboxy-3,6-dimethyl-pyridazine, and also the dicarboxypyrimidines such as 4,5-dicarboxypyrimidine and 4,6-dicarboxy-pyrimidine. Also included are the thiazole polycarboxylic acids such as the dicarboxythiazoles, as well as the derivatives thereof substituted on the nucleus, such as 2-methyl-4,5-dicarboxythiazole.

The invention also includes the preparation of these $N^4$-carboxyacylsulphanilylsulphanilamidothiazoles by heating the desired polycarboxylic acid, its anhydride, or an ester, such as an alkyl ester, or a monohalide, such as the monochloride or a monochloride of the ester, or acid chloride such as the di-acid chloride, thereof with, for example, any desired sulphanilylsulphathiazole, either merely together or in an inert reaction medium such as an inert solvent, and as in the latter case separating the desired end product or, as in the case of the use of the ester or the acid chloride, liberating the end product by hydrolysis, and in any case, where necessary, subjecting it to purification as by recrystallization. Thus, for example, with the aliphatic dicarboxylic acids having less than four carbon atoms in the chain, the alkyl diester of the dicarboxylic acid is reacted with the sulphanilylsulphathiazole selected. With the aliphatic acids having four and five carbon atoms in the chain and with the aromatic polycarboxylic acids having two carboxyl groups ortho to each other, the desired anhydride is taken as the starting material, while with the aliphatic acids having over five carbon atoms in the chain and with the aromatic acids having no carboxyl group in ortho position to another carboxyl group, the free acid may be heated directly with the selected sulphanilylsulphathiazole. If desired, the monohalide of the ester of any of the acids may be used as the starting material.

The invention may be illustrated by, but not restricted to, the following:

*Example.—$N^4$-succinyl-$N^1$-4-(2-thiazolyl-sulphamyl)-phenylsulphanilamide*

25.5 grams of sulphathiazole was dissolved by warming in 200 cc. of dry pyridine. To this was added, in portions with stirring, 34.0 grams of p-acetylamino-benzene sulphonyl chloride. The reaction mixture after standing overnight was poured into a mixture of crushed ice and hydrochloric acid. The resulting precipitated solid was collected on a filter and washed with water. The crude acetyl derivative,

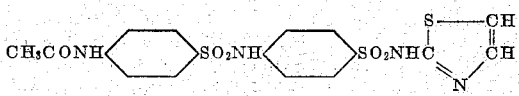

thus obtained was heated in a mixture of 400 cc. of 6N hydrochloric acid and 50 cc. of ethyl alcohol. After about 30 minutes heating, the deep red solution which resulted was decolorized with charcoal, cooled slightly, and the solid sulphanilyl-sulphathiazole,

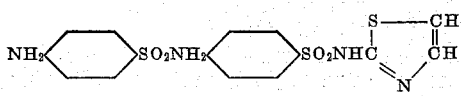

precipitated by adding 200 cc. of concentrated ammonia, melted at 168° C. 11.82 grams of this intermediate was suspended in 100 cc. of dry dioxan, heated to reflux, and 8.0 grams of succinic anhydride added with stirring. The reaction mixture was refluxed further for 20 minutes, during which period, all of the material went into solution and a solid subsequently started crystallizing out. The cooled reaction mixture was filtered and washed with dilute hydrochloric acid, yielding 12.18 grams of $N^4$-succinyl-$N^1$-4-(2-thiazolylsulphamyl)-phenylsulphanilamide,

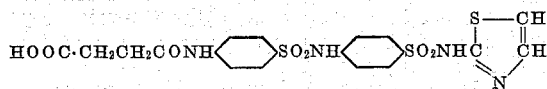

which crystallized from a water-dioxan mixture as needles decomposing at 233° C.

By replacing the succinic anhydride in this example by the equivalent quantity of the possible inner anhydrides of other succinic acid derivatives, such as pyrotartaric, ethylsuccinic, maleic and citraconic acid anhydrides and the like or by glutaric anhydride, or by phthalic, cumidic or hemipic anhydride, or the anhydride of diphenic acid or of naphthalic acid, corresponding $N^4$-carboxyacylsulphanilylsulphathiazoles are obtained, for example:

$N^4$- pyrotartaryl-$N^1$- 4 -(2 - thiazolylsulphamyl) - phenylsulphanilamide, $N^4$-ethylsuccinyl - $N^1$- 4 -(2-thiazolylsulphamyl) - phenylsulphanilamide, $N^4$-maleyl-$N^1$- 4 -(2-thiazolylsulphamyl) -phenyl-sulphanilamide, $N^4$- citraconyl - $N^1$- 4 -( 2 - thiazolylsulphamyl) - phenylsulphanilamide, $N^4$-glutaryl-$N^1$-4-(2-thiazolylsulphamyl) -phenyl-sulphanilamide, $N^4$- phthalyl - $N^1$- 4 -(2 - thiazolylsulphamyl) - phenylsulphanilamide, $N^4$-cumidyl-$N^1$-4-(2-thiazolylsulphamyl) -phenyl-sulphanilamide, $N^4$-hemipyl-$N^1$-4-(2-thiazolylsulphamyl) -phenyl-sulphanilamide, $N^4$- diphenoyl - $N^1$- 4 -(2 - thiazolylsulphamyl) - phenylsulphanilamide, and $N^4$-naphthaloyl - $N^1$- 4 -(2 - thiazolylsulphamyl) - phenylsulphanilamide.

Similarly, by separately replacing the succinic anhydride by the equivalent quantity of 2,3-dicarboxy-pyrazine anhydride, and the anhydride of 2,3-dicarboxy-5,6-dimethyl-pyrazine and of 2,3-dicarboxy-5-methyl-pyrazine, there results the corresponding: $N^4$-(3-carboxy-pyrazinoyl) - $N^1$- 4 -( 2 - thiazolylsulphamyl) -phenylsulphanilamide, $N^4$-(3-carboxy-5,6-dimethyl-pyrazinoyl) - $N^1$- 4 -(2 - thiazolylsulphamyl) - phenylsulphanilamide, and $N^4$-(3-carboxy-5-methyl-pyrazinoyl) - $N^1$- 4 -(2 - thiazolylsulphamyl) - phenylsulphanilamide. Likewise, with the corresponding stoichiometric equivalent of respectively quinolinic acid anhydride, cinchomeronic acid anhydride and of 2-methyl-4,5-carboxythiazole anhydride, there results: $N^4$-quinolinoyl-sulphanilylsulphathiazole, cinchomeronoyl- and (2-methyl-5-carboxythiazole-4-carboxylyl) -$N^1$-4-(2-thiazolylsulphamyl) -phenylsulphanilamide.

By heating 5 grams of sulphanilylsulpha-thiazole with a substantial excess of ethyl oxalate on a hot plate at around 130–150° C. for about two hours with occasional stirring and then washing the reaction mixture with dilute hydrochloric acid and water and directly or after intermediate purification, for example, by recrystallizations such as from dilute alcohol, placing the reaction product in approximately 150 cc. of a 2.5% solution of sodium hydroxide and heating on the hot plate for around a half hour at 95–100° C., and then decolorizing the solution with charcoal and making it slightly acid by the addition of concentrated hydrochloric acid, there results $N^4$-oxalyl-sulphanilylsulphathiazole. By replacing the ethyl oxalate by ethyl malonate, there results $N^4$-malonyl-$N^1$-4-(2-thiazolylsulphamyl) -phenyl-sulphanilamide.

The corresponding carboxyacylsulphanilylsulphathiazoles from the transform succinic acid derivatives may be obtained by replacing the ethyl oxalate or malonate in the immediately preceding procedure by an equivalent quantity of a monochloride-ester of such succinic acid derivative or unsaturated isomer and with little or no heating, for example, with the equivalent quantity of the monochloride of the ethyl ester of, for example, fumaric or mesaconic acid.

These compounds and those from the amino- and hydroxy-substituted derivatives of succinic acid are exemplified by: $N^4$-malylsulphanilyl-sulphathiazole, $N^4$ - aspartylsulphanilylsulpha-thiazole, $N^4$-citramalylsulphanilylsulphathiazole, $N^4$- tartarylsulphanilylsulphathiazole, $N^4$- fumarylsulphanilylsulphathiazole and $N^4$-mesaconyl-sulphanilylsulphathiazole.

Similarly, there is obtained $N^4$-citrylsulphanil-ylsulphathiazole, $N^4$-glutamylsulphanilylsulpha-thiazole, $N^4$-talomucylsulphanilylsulphathiazole, $N^4$-tricarballylsulphanilylsulphathiazole, $N^4$-aconitylsulphanilylsulphathiazole, $N^4$ - mellitylsul-phanilylsulphathiazole, $N^4$-coccinylsulphanilyl-sulphathiazole and $N^4$-(4-hydroxy-3-carboxyl-benzoyl) -sulphanilylsulphathiazole.

By heating separate 10 gram portions of sulphanilylsulphathiazole separately with an equimolecular weight of adipic acid, pimelic acid, suberic acid, azelaic acid and sebacic acid, at around 130–150° C. for at least twenty minutes and then treating the respective reaction mixtures separately with a suitable quantity, for example, 60 cc. of 10% sodium carbonate solution, filtering off the insoluble, undesired by-products, and neutralizing the filtrate with dilute hydrochloric acid, there results the corresponding: $N^4$-adipyl-$N^1$-4-(2 - thiazolylsulphamyl) -phenyl-sulphanilamide, $N^4$-pimelyl-$N^1$-4-(2-thiazolylsul-phamyl) -phenylsulphanilamide, $N^4$-suberyl-$N^1$-4-(2 - thiazolylsulphamyl) - phenylsulphanilamide, $N^4$-azelayl-$N^1$-4-(2- thiazolylsulphamyl) -phenyl-sulphanilamide, and $N^4$-sebacyl-$N^1$-4-(2-thiazol-ylsulphamyl) -phenylsulphanilamide.

By heating sulphanilylsulphathiazole with approximately a 15% excess over an equimolecular portion of respectively lutidinic acid, dinicotinic acid, and dipicolinic acid, in intimate mixture to a fusion temperature around between 160–190° C. in a sand bath for about between an hour and an hour and a half with occasional manual stirring, then cooling the melt and taking it up in dilute alkali, around 5%, and precipitating with a slight excess of hydrogen chloride, and then filtering off the precipitate and treating it with cool sodium bicarbonate solution and filtering off the soluble residue, and then making this filtrate slightly acid with hydrogen chloride, there result the following corresponding products, which may be further purified by, for example, reprecipitation: $N^4$-lutidinoyl-$N^1$-4-(2-thiazolylsulphamyl)-phenylsulphanilamide, $N^4$-dinicotinoyl-$N^1$-4-(2-thiazolylsulphamyl)-phenylsulphanilamide, and $N^4$-dipicolinoyl-$N^1$-4-(2-thiazolylsulphamyl)-phenylsulphanilamide.

By adding an equimolecular stoichiometric equivalent of sulphanilylsulphathiazole in small portions over a forty minute period to a solution of a given amount of the di-acid chloride of 4,6-dicarboxypyrimidine in a suitable quantity of a solvent such as dioxan (for example, .006 mol of each reactant in about 50 cc. of solvent) and permitting the mixture to stand at room temperature for about at least ten minutes after the addition is completed, and then pouring the mixture into a suitable quantity (approximately 100 cc.) of dilute sodium bicarbonate solution, filtering off the insoluble portion after the effervescence discontinues, then clarifying the filtrate with charcoal and after the removal of the latter making the filtrate acid with hydrogen chloride and chilling it, there results $N^4$-(6-carboxy-pyrimidine-4-carboxylyl)-sulphanilylsulphathiazole.

The carboxylate form of any of the compounds of the invention may be prepared, for example, by adding to a small amount of water an excess of the compound over its solubility in water and dissolving the excess by stirring in a sufficient quantity of, for example, anhydrous sodium carbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salts, preferably in aqueous solution, with a suitable soluble salt of the metal, the carboxylate salt of which is desired. The desired carboxylate salt is obtained by resulting double decomposition.

The compounds of the invention, applicable in treating ailments of the intestinal tract, exhibit such activity by the introduction to the various nuclear portions of the individual compound, of substituents, the introduction of which into the basic nucleus leaves the compound substantially non-toxic so that it would cause no permanent injury to the subject when administered in the necessary therapeutic dosage. The metallic element in the compounds used as in preparations for treating intestinal ailments are such that their inclusion in the compound introduces similarly no unduly toxic characteristics. Thus, for example, as with $N^4$-succinylsulphanilylsulphathiazole, it is possible to build up a high concentration in the intestinal tract without a simultaneously high blood level.

The various compounds, used in the treatment of intestinal ailments are administered orally, either in the form of tablets, capsules or powders of the solid material, or as solutions of any suitable concentration thereof.

While the compounds constituting the invention have been described by reference to certain specific embodiments thereof, other modifications, extensions or substitutions may be made therein within the scope of the depending claims as limited by the state of the art.

What is claimed is:

1. $N^4$ - carboxyacyl - $N^1$ - [4 - (2 - thiazolyl - sulphamyl) -phenyl] -sulphanilamides having the general formula

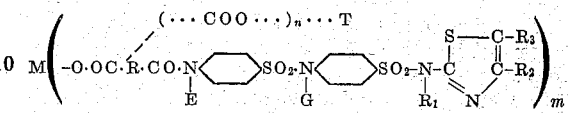

and the carboxylates thereof, in which R is the residue of a polycarboxylic acid stripped of its carboxyl groups; $n$ is selected from zero and any whole number less than five; E, G and $R_1$ are each separately and independently a member of the class consisting of hydrogen and alkyl, aralkyl and aryl radicals; and the thiazole ring together with $R_2$ and $R_3$ attached to that ring represent a member of the class consisting of thiazole radicals.

2. $N^4$ - carboxyacyl - $N^1$ - [4 - (2 - thiazolyl - sulphamyl) -phenyl] -sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond.

3. $N^4$ - carboxyacyl - $N^1$ - [4 - (2 - thiazolyl - sulphamyl) -phenyl] -sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, in which the carboxyacyl group is aliphatic.

4. $N^4$ - carboxyacyl - $N^1$ - [4 - (2 - thiazolyl - sulphamyl) -phenyl] -sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, in which the carboxyacyl group is aromatic.

5. $N^4$ - carboxyacyl - $N^1$ - [4 - (2 - thiazolyl - sulphamyl) -phenyl] -sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, in which the carboxyacyl group is heterocyclic.

6. $N^4$ - carboxyacyl - $N^1$ - [4 - (2 - thiazolyl - sulphamyl) -phenyl] -sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is saturated aliphatic.

7. $N^4$ - carboxyacyl - $N^1$ - [4 - (2 - thiazolyl - sulphamyl) -phenyl] -sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is saturated aliphatic and is free of substituents on the methylene carbons of its chain.

8. $N^4$ - carboxyacyl - $N^1$ - [4 - (2 - thiazolyl - sulphamyl) -phenyl] -sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is aliphatic and has four carbon atoms in its carbon chain.

9. N⁴ - carboxyacyl - N¹ - [4 - (2 - thiazolyl - sulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is saturated aliphatic and has four carbon atoms in its carbon chain.

10. N⁴ - carboxyacyl - N¹ - [4 - (2 - thiazolyl - sulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is saturated aliphatic and has four carbon atoms in its carbon chain and is free of substituents on the methylene carbons of its chain.

11. N⁴-succinyl-N¹-[4-(2-thiazolylsulphamyl)-phenyl]-sulphanilamide, in which the 2-thiazolylsulphamyl group is the radical

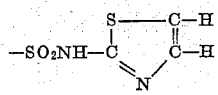

12. N⁴ - carboxyacyl-N¹-[4-(2-thiazolylsulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is derived from an aryl dicarboxylic acid.

13. N⁴ - carboxyacyl-N¹-[4-(2-thiazolylsulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is derived from a mononuclear aryl dicarboxylic acid.

14. N⁴ - carboxyacyl-N¹-[4-(2-thiazolylsulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is derived from a mononuclear aryl dicarboxylic acid having its carboxy groups in ortho position to one another.

15. N⁴ - carboxyacyl-N¹-[4-(2-thiazolylsulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is derived from a mononuclear aryl dicarboxylic acid having its aryl radical free of substituents on the remaining nuclear carbons.

16. N⁴ - phthalyl - N¹ - [4-(2-thiazolylsulphamyl)-phenyl]-sulphanilamide in which the 2-thiazolylsulphamyl group is the radical

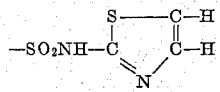

17. N⁴ - carboxyacyl - N¹-[4-(2-thiazolylsulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is derived from a dicarboxypyridine.

18. N⁴ - carboxyacyl-N¹-[4-(2-thiazolylsulphamyl)-phenyl]-sulphanilamides, in which "2-thiazolylsulphamyl" represents a thiazolyl nucleus linked through its carbon atom in the 2-position to the sulphonamido nitrogen and having its carbon atoms in the four and five positions linked to one another by a double bond, and in which the carboxyacyl group is derived from a dicarboxypyridine having its carboxy groups in ortho position to one another.

19. N⁴ - carboxyacyl-N¹-[4-(2-thiazolylsulphamyl)-phenyl]-sulphanilamides, in which "2-thiazolylsulphamyl" represents a thiazolyl nucleus linked through its carbon atoms in the 2-position to the sulphonamido nitrogen and having its carbon atoms in the four and five positions linked to one another by a double bond, and in which the carboxyacyl group is derived from a dicarboxypyridine free of substituents on the remaining nuclear atoms.

20. N⁴ - quinolinyl - N¹-[4-(2-thiazolylsulphamyl)-phenyl]-sulphanilamide, in which the 2-thiazolylsulphamyl group is the radical

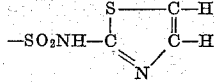

MAURICE L. MOORE.